July 10, 1956    F. J. BIEBER ET AL    2,753,622
METHOD OF MAKING A SPOOL
Filed April 8, 1955
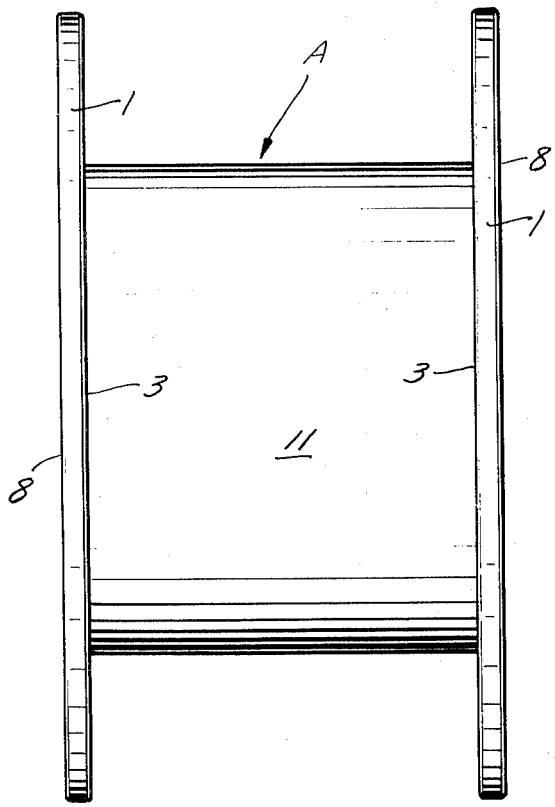
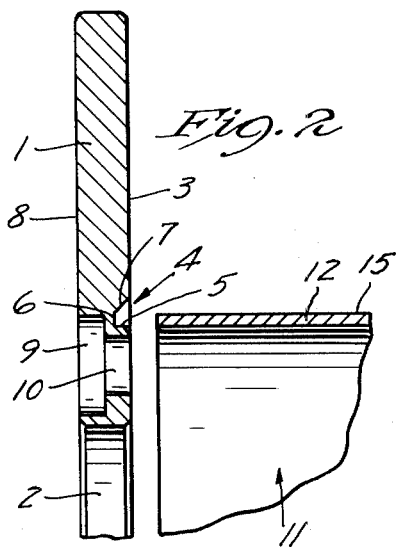
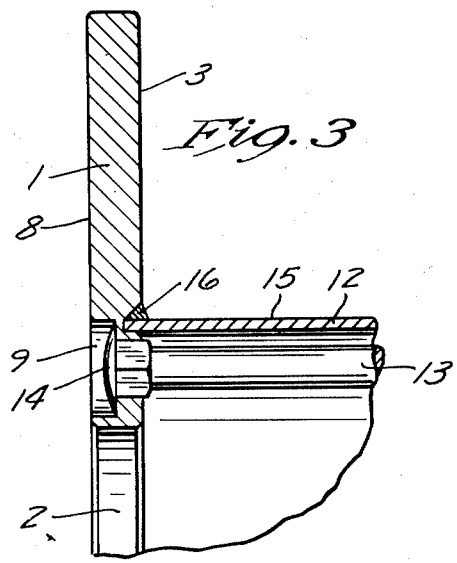
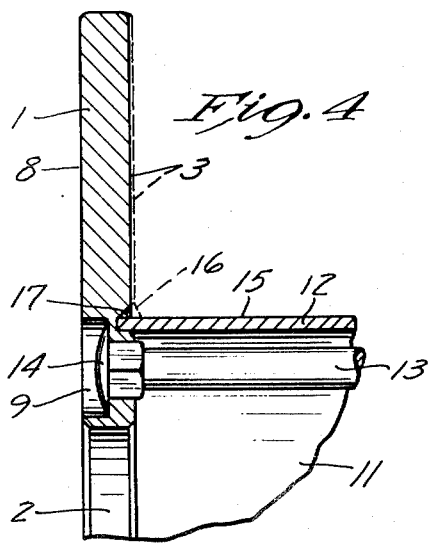
INVENTORS
FREDERICK J. BIEBER
CLARENCE I. STEINBACK
BY
Merchant & Merchant
ATTORNEYS

United States Patent Office 2,753,622
Patented July 10, 1956

2,753,622

METHOD OF MAKING A SPOOL

Frederick J. Bieber and Clarence I. Steinback, Minneapolis, Minn., assignors to Acrometal Products, Inc., Minneapolis, Minn., a corporation of Minnesota Application April 8, 1955, Serial No. 500,213

3 Claims. (Cl. 29—462)

Our invention relates to winding drums or spools and, more particularly, to a novel method of forming same whereby to attain a great strength and precision.

The primary object of our invention is the provision of a novel method of forming and welding together the component parts of a metallic winding drum whereby the welded area and surface adjacent thereto may be machined after welding to attain smooth, accurate joints without weakening the weld between the several component parts.

A further object of our invention is the provision of a method of making a device of the class above described which is formed from a minimum of parts, is relatively light in weight, and which is extremely strong and durable.

A still further and highly important object of our invention is the provision of a method of making a metallic winding spool which has a high degree of balance, is completely free of any crack or crevice, and which can, therefore, be used for the winding of even the finest thread-like material thereon.

A still further object of our invention is the provision of a method of making a device of the class above described which has a high degree of balance and, hence, may be rotated at high speeds without undue vibration.

The above and still further objects of our invention will become apparent from the following detailed specification, appended claims, and attached drawings:

Referring to the drawings, wherein like characters are indicated by like parts throughout the several views:

Fig. 1 is a view in top plan of our novel winding drum;

Fig. 2 is an enlarged fragmentary view in vertical section illustrating one step in the formation of our novel device;

Fig. 3 is a view corresponding to Fig. 2 but illustrating a further step in the manufacture of our novel device; and Fig. 4 is a view corresponding to Fig. 3 but illustrating a still further step in our novel method.

Referring with greater particularity to the drawings, the letter A indicates in its entirety the assembled winding drum comprising, a pair of annular flanges 1, the central openings of which are identified by the numeral 2. The opposed inner surfaces 3 of the flanges 1 are formed to provide annular recesses 4 which are concentric with the axes of the flanges 2 and are radially outwardly spaced from but closely adjacent to the central openings 2 therein. Recesses 4 have radially inner walls 5 which are cylindrical and are concentric to the axes of the flanges 1. Recesses 4 have bottom walls 6 therein which are normal to the axes of said flanges 1; and outwardly tapering radially outer walls 7.

The relatively flat outer surfaces 8 of the flanges 1 are provided with a plurality of circumferentially spaced recesses 9 which extend part way therethrough and with reduced axial openings 10 which extend from the recesses 9 through to the opposite or inner wall 3. As shown, the openings 10 are radially inwardly spaced from the annular recesses 4, whereas the radially outermost portion of the recesses 9 overlie the flat bottoms 6 of the channels 4, for a purpose which will hereinafter become apparent.

The next step in our novel method includes the forming of the tubular cylindrical drum section 11. As shown, the internal diameter of the drum section 11 corresponds approximately to the diameter of the cylindrical walls 5 of the recess 4, whereas the transverse thickness of the wall 12 of the drum 11 corresponds approximately to the width of the flat bottom 6 of the annular recesses 4.

The next step in our novel method comprises placing the flanges 1 on the opposite ends of the drum section 11, with the opposite end portions of said drum section 11 received within the annular recesses 4. Thereafter, a plurality of tie-bolts 13 having enlarged heads 14 on opposite ends thereof are placed with the enlarged heads 14 being snugly received within the spaced recesses 9. The position of the tie-bolts 13 and of the enlarged heads 14 is shown in Figs. 3 and 4. It is important to note that portions of the heads 14 overlie the opposite ends of the tubular drum section 11 whereby when clamping force is brought to bear upon the flanges 1 through the medium of nuts or the like, not shown, on the opposite ends of the tie-bolts 13, said force will be exerted directly against opposite ends of the drum section 11. This factor tends to retain the radially projected portions of the flanges 1 in the desired 90 degree relationship with the tubular drum section 11.

The next step in our novel method includes the welding together of the flanges 1 and the opposite end portions of the drum section 11. It will be noted that an annular tapering groove remains between the outer surface 15 of the drum section 11 and the outwardly tapering radially outer wall 7 of the recesses 4. This groove is more than filled with the welding material, during the welding operation as indicated by the numeral 16 in Fig. 3. This welding operation not only avoids any possibility of a crack or crevice but also secures the elements 1 and 11 together. However, as shown in Fig. 3, undesirable roughness is created by virtue of the welding operation. Therefore, we have found it highly desirable to machine the interior surfaces 3 of the flanges 1 and the adjacent exterior surface 15 of the drum section 11 and at the same time to remove any welding material, as shown in Fig. 4. Such a final operation not only creates perfectly smooth surfaces 3—15 which are precisely 90 degrees to each other but also leaves a welded cement 17 positively securing together the opposite ends of the drum sections 11 and the flanges 1.

Our invention has been thoroughly tested and found to be completely satisfactory for the accomplishment of the above objects, and while we have disclosed a preferred embodiment thereof, it should be obvious that same is capable of modification without departure from the scope of the appended claims.

What we claim is:

1. The method of forming precision winding drums which includes, forming a pair of annular flanges to provide opposed annular recesses therein, said recesses having radially inner cylindrical walls which are concentric to the axes of said flanges, said recesses having bottom walls which are normal to the axes of said flanges, and said recesses having outwardly tapering radially outer walls, forming a cylindrical tubular drum section the internal diameter of which is only slightly greater than the diameter of the cylindrical inner walls of said recesses, placing said flanges on the opposite ends of said drum section with the opposite end portions of said drum section received within said annular recesses, welding the opposite end portions of said drum section to the adjacent of said flanges in a manner to more than fill the tapering cavity formed between the cylindrical wall of said drum section and the tapering outer walls of said recesses, and finally machining said welded area and the adjacent surface portions of said drum section and flanges to produce smooth accurate 90 degree joints therebetween.

2. The method called for in claim 1 wherein the width of the bottom walls of said recesses are formed to correspond approximately to the width of the material from which said drum section is formed.

3. The method called for in claim 1 in further combination with the step of securing together the flanges by means of circumferentially spaced headed tie-bolts radially inwardly of said drum section, the headed areas of said tie-bolts overlying opposite end portions of said drum section.

No references cited.